United States Patent Office 3,481,218
Patented Dec. 2, 1969

3,481,218
HANDLES FOR USE IN BICYCLES
Seitaro Yoshikawa, Tokyo, Japan, assignor to Nitto Handle Works Co., Ltd., Tokyo, Japan, a corporation of Japan
Filed Feb. 13, 1968, Ser. No. 705,084
Claims priority, application Japan, Sept. 30, 1967 42/82,948, 42/82,949
Int. Cl. B62k 21/16
U.S. Cl. 74—551.3                    2 Claims

ABSTRACT OF THE DISCLOSURE

This invention provides a handle for use in bicycles and includes a handlebar supported by a holding member and being divided into main body and left and right grip members and including means between said body and grip members whereby the latter may be fixed at desired angles.

---

This invention relates to improvements in or relating to handles for use in bicycles. In handles for use in bicycles heretofore known, the handle bar which is a component of the handle has been processed and formed from a single pipe and therefore has a fixed shape. Accordingly, part of the handle bar, particularly the portions gripped by hands during the operation of the bicycle is successively fixed to other portions and is not shaped to facilitate dissembling and transporting. Consequently, when the handle bar is supported on a holding portion at the upper part of the handle stem in a like manner as in the conventional method so that the fitting angle may be changed around the horizontal axis, the handle bar optionally rotates around the central horizontal axis of the aforementioned holding portion thereby to be supported and fixed at the desired fitting angle. The shape of the handle bar, however, is fixed and hence cannot be changed. The handle bar has various types such as drop type, flat type and upturn type. It is, however, impossible to provide a handle capable of displaying all the aforementioned features of these types.

Moreover, since the handle for use in bicycles has a complicated shape, it has a drawback in that it is very difficult to transport it in a single or a number of handles by packing them and further loading them on train or aircraft by packing the handle in the travelling bag together with the bicycle body because of bulkiness of the front width of bicycle bar.

It is, therefore, an object of the present invention to provide improvements in or relating to the handles for use in bicycles having a handle bar of a conventional fixed shape.

The first feature of the present invention resides in that grip members at both ends of the handle bars are separated from the main body of the handle bar and are coupled freely thereto at a fitting angle. The main body generally has such a modified U-shape and the central portion is rectilinear, the left and right portions are inclined, and the short heads of the grip members are connected to both side ends of the main body at a fitting angle. As the result, the grip members can move in a plane perpendicular to the central axis of both side ends of the main body. The handle bar manufactured in accordance with the present invention may have a specific shape, for example, the main body may have a mere rectilinear shape or the grip may be formed in a modified T-shape where the grip is not perpendicular but inclined to the main body. In the case of modified T-shaped grip, the grip can move in a conical plane having an inclined angle to the central axis of both side ends of the main body. As the result of this feature, the main body of the handle bar is supported on its holding portion in a freely rotatable manner, whereby the grip portion is easily fitted at an angle suitable for the cases of using drop type, flat type, upturn type or intermediate type, and thus it is possible to apply the handle bar to various uses.

The second feature of the present invention relates to the mechanism of fitting means between the main body of the handle bar and the grips. The head of grip is shaped into a short drum having an inner diameter capable of being fitted onto end portion of the aforementioned main body, and one end being closed, radial teeth being notched in the inner face of said closed end and a bolt for clamping use being inserted in a freely rotatable manner. On the other hand, to both ends of the main body of the handle bar there are fixed end pieces having radial teeth capable of engaging with the aforementioned teeth, and a screw hole into which the aforementioned bolt is screwed is formed in the center of said end pieces. According to the aforementioned mechanism, when the clamping bolt is released, the teeth of the grip and end piece are disengaged, a desired adjustment of the fitting angle can be effected by rotating the grip by the suitable number of teeth, and these teeth again clamped and fixed by means of the clamping bolt. As for a mechanism to satisfy the first feature in addition to the aforementioned mechanism, it is possible to use, for example, a mechanism conventionally used when the handle stem is inserted and fixed in the fork tube of the front wheel, i.e., a system wherein a vertical groove is notched at the lower end of the handle stem and an expander cone is inserted inwardly from the lower end thereof by rotating the expander bolt and the lower end of the handle stem is expanded in the fork tube or the lower end of the handle stem is cut into a taper shape and the taper shape pieces are faced to each other and fixed by screwing a bolt thereinto to swell. However, when this mechanism is intended to apply to the case of present invention, double inner and outer pipe shaped portions are formed in the grip member, and the end portion of main body of the handle bar is inserted between double pipe portions, and a vertical groove is formed in the inner pipe, and an expander cone is inserted thereinto from the end portion thereof or a taper piece is faced to the tapered end. It has, therefore, such a drawback that the structure becomes complicated while the manufacture becomes difficult, and moreover the holding power to fix and hold the grip portion at a desired fitting angle is not sufficient. When the present invention uses aforementioned radial teeth engagement system, it is possible to easily overcome such drawbacks.

The third feature of the present invention resides in that an angle indicator is arranged at the joint portion between both portions, whereby it is possible to observe the fitting angle between the main body of handle bar and the grip from the outside. More particularly, angles are graduated on the inner side of a portion on which the grip of the main body of handle bar is fitted and the fitting angle of the grip is simply indicated by reading the graduations corresponding to the indication marks at the end of the other grip. The shape of handle bar is complicated and it is difficult to determine whether or not the left and right grips are fixed to the main body of the handle bar at the same angle, and sometimes both left and right grips are fitted at different angles. It is possible to check the fitting angles of both left and right grips extremely simply and clearly as the present invention teaches. Further, the angle graduated at the main body of handle bar does not always indicate angle graduation but suitble angles may be graduated, for example, as drop graduation, flat graduation and upturn graduation. Fine adjustment may be obtained firstly by these graduations and further, upon rotational movement, by the movement of engaged radial teeth. Further, the graduations of fitting angle are made at the central portion of the main body of the handle bar and allowed to correspond to indication marks on the bar holding portion to obtain the fitting angle for handle bar itself. It can, therefore, easily materialize the ideal fitting angle and shape of the handle bar by carrying out both graduations.

Figure 1:
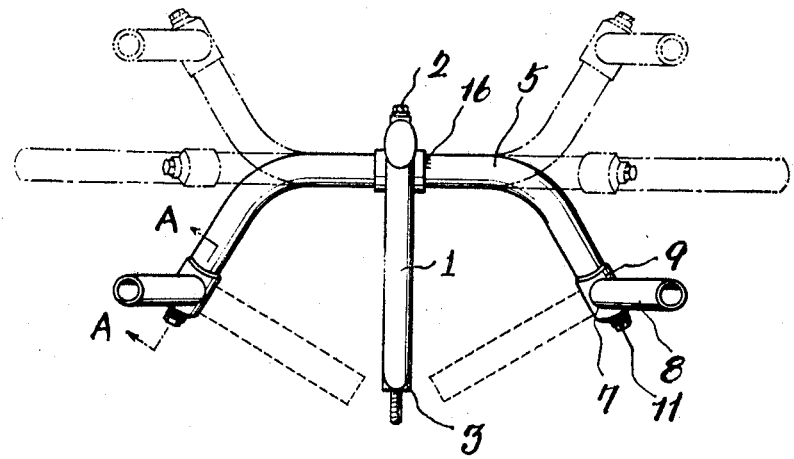
FIG. 1 is a side elevation showing a preferred embodiment of a handle for use in bicycles manufactured in accordance with the present invention.

In the drawings, reference numeral 1 designates a handle stem which is fixed to a fork tube (not shown) by pulling up a taper piece 3 within the fork tube by means of an expander bolt 2. Reference numeral 4 designates a handle bar holding portion fixed on the upper portion of the handle stem 1, the forward end of said holding portion forming an open mouth drum and in the inner part thereof the main body 5 of handle bar being inserted, clamped and fixed by means of a bar clamping bolt 6. The main body of the handle bar is rectilinear at its central portion and has inclined, modified U-shape portions at its both left and right sides. Reference numeral 7 designates a grip of the handle bar formed into a short headed, modified T shape. The grip 7 comprises a pipe shaped trunk portion 8 and a head portion 9 which is fixed thereto and has an inner diameter capable of being fitted in the end portion of the main body of handle bar and a short pipe shape, one end thereof being closed. On the inner face 7 of said closed end portion there are arranged radial teeth 10, and on the central portion thereof there is formed a bore 12 for penetrating a grip clamping bolt 11. Also, to the both ends of main body 5 of handle bar there are fixed end pieces 13, in the center of said end piece 13 there is provided a female screw 14. At its outer face there are provided radial teeth 15 which engage with radial teeth 10. Reference numerals 16 and 18 designate angle graduations provided on the main body of handle bar, 17 and 19 respectively indication marks made at the side face of the handle bar holding portion 4 and at the side face of the grip head 9.

Figure 2:
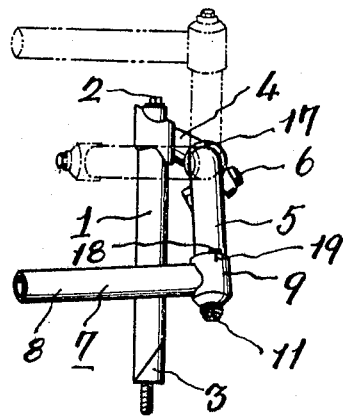
FIG. 2 is a side elevation showing the same.
Figure 3:
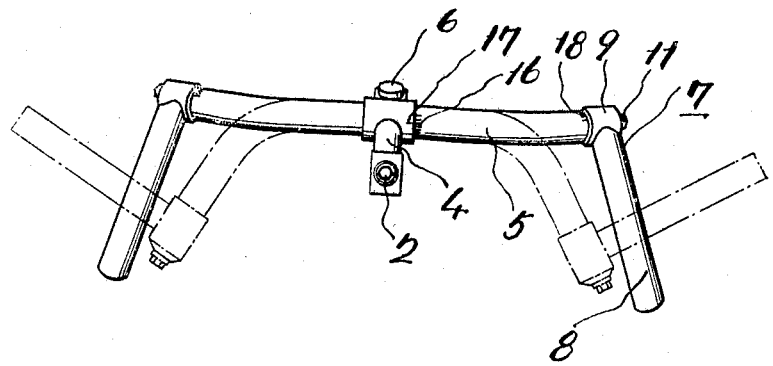
FIG. 3 is a plan view showing the same.
Figures 4, 5:
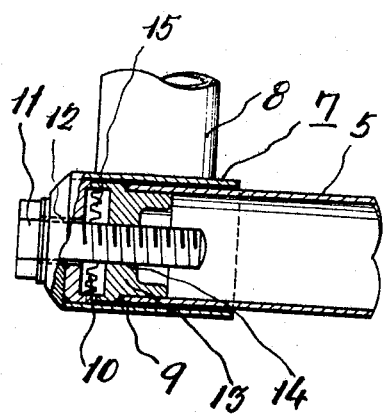
FIG. 4 is an enlarged sectional view, partly broken away, taken on the line A—A of FIG. 1.
FIG. 5 is a front view showing main parts of the handle for use in bicycles embodying the present invention.

In the aforementioned embodiment, full lines in FIGS. 1 to 3 indicate the case of using the handle bar of the present invention as the drop type, one-dot chain lines the case of using the same as the flat type and two-dot lines indicate using the same as the upturn type respectively. The dotted line indicates the positions of admitting the handle bar into a case during packing and the like.

To convert it into the states of the aforementioned cases, the bar clamping bolt 6 is released firstly, and then the main body 5 of the handle bar is brought into states as indicated in the drawings by the graduations 16 and indication marks 17, for example, the state of the flat type shown by one-dot chain lines. Thereafter, the clamping bolt 6 is clamped and fixed. Then, the grip clamping bolt 11 is released to disengage the radial teeth 10 at the head 9 of grip 7 from the radial teeth 15 of the end piece 13 of handle bar, and rotated to the states as shown in the drawings by means of the graduations 18 and indication marks 19, and the grip clamping bolt 11 is clamped at this state. Thus, it is possible to simply and easily convert it in a desired type, for example, flat type. In the same manner it can be converted in the upturn type. With respect to the intermediate type, it is possible to determine the intermediate portion in left and right equal portions by counting the number of impact due to the engagement between teeth upon the movement of radial teeth 10 and 15 which are engaged with each other. In the like manner, when it is made into the state shown by dotted line, the whole handle for bicycles can be exceedingly miniaturized and hence accommodation in the case can be extremely facilitated.

Having now particularly described and ascertained the nature and structure of the present invention, we declare that what we claim is:

1. A handle for use in bicycles comprising a handle bar supported at its central portion by a holding member disposed at the upper portion of a handle stem, said handle bar being divided into a main body and right and left grip member, said grip members having head portions with an inner diameter capable of fitting over the end portions of the main body, said head portions being closed at one end and having notched radial teeth on the inner face of said closed end and having a central aperture in said closed end, the end portions of said main body having radial teeth engaging said notched radial teeth on said closed end inner face and central threaded holes in said end portions, bolts passing through the closed ends of the head portions and clamping said grip members to said main body.

2. The handle as set forth in claim 1 wherein there are angle graduation means at the joint portions of said main body and the grip members for indicating the fitting angle between the members and the main body.

References Cited

UNITED STATES PATENTS

| | | | |
|---|---|---|---|
| 560,700 | 5/1896 | Fisher | 74—551.4 |
| 597,801 | 1/1898 | Hall | 74—551.3 XR |
| 659,123 | 10/1900 | Bies | 74—551.4 |
| 691,830 | 1/1902 | Whitely et al. | 74—551.4 |
| 1,595,557 | 8/1926 | Mamiya | 74—551.4 |

FOREIGN PATENTS 395,697 7/1933 Great Britain.

FRED C. MATTERN, Jr., Primary Examiner

F. D. SHOEMAKER, Assistant Examiner

U.S. Cl. X.R.

74—551.4